Oct. 28, 1958   K. RANTSCH   2,857,804
INTERFEROMETER
Filed Feb. 28, 1956
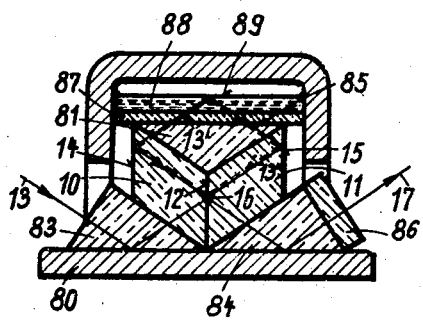

United States Patent Office 2,857,804
Patented Oct. 28, 1958

2,857,804

INTERFEROMETER

Kurt Rantsch, Wetzlar, Hesse, Germany, assignor to Carl Zeiss, Heidenheim (Brenz), Wuerttemberg, Germany Application February 28, 1956, Serial No. 568,419

Claims priority, application Germany March 4, 1955

1 Claim. (Cl. 88—14)

The invention relates to an interferometer with which it is possible, instead of a bubble, to determine the horizontal position of a body.

It is an object of the invention to design such an interferometer with a few construction units.

It is a further object of the invention to compose the interferometer of a prism combination which on the one hand has a semi-permeable mirror which effects the separation and reunion of the light rays and which on the other hand has totally reflecting surfaces which make the divided partial rays run through the interferometer mainly in the same course but in opposite direction. By this the two partial rays touch the same optical elements and therefore manufacturing errors of these elements causes no disturbances of the interference bands.

Another object of the invention is to close the prism combination by another prism and a glass plate carrying a liquid in such a way that the light rays leaving that prism combination fall on this glass plate and the liquid reflecting the light into the prisms. If the prism combination which is connected with the body to be levelled will be inclined the surface of the liquid layer is inclined relative to the plane glass plate and thereby the partial rays are deflected which causes a displacement of the interference bands in the interferometer. The magnitude of this displacement of the interference bands is a measure of the inclination of the prism combination.

Another subject of the invention is to prevent ripples on the surface of the liquid owing to the percussions etc. as they frequently occur when using mercury surfaces as mirrors. This is achieved by using an oil layer instead of mercury and by the light rays not being reflected on the surface of the liquid as in the case of mercury but having a total reflection in that oil.

A form of construction of the invention is shown on the drawing.

In the figure the prisms 10 and 11 are arranged in a housing 80. The prisms 10 and 11 are supplemented by a prism 81 in such a way that a plane surface 85 is formed upon their upper side. For the purpose of deflecting the incident light ray 13 and the emergent light ray 17 to a comfortable observing direction further prisms 83 and 84 are cemented to the prisms 10 and 11. In the light path of the emergent light ray 17 a plate 86 is arranged which acts as an analyzer in polarized light. To the surface 85 a glass-plate 87 is cemented which is attached to the housing 80 liquid-tight. Upon the glass plate 87 there is an oil layer 88 with a free surface 89.

The mode of action of this device is as follows:

In the position of the device drawn in the figure the dividing surface 12 includes with the surface 89 of the oil layer 88 an angle of accurately 90°. The ray 13 entering the prism 83 is in this case divided into the parts 13′ and 13″ at point 16 of the dividing surface 12, and the divided rays 13′ and 13″ are totally reflected at the surface 89 of the oil layer 88, whereafter they unite again at point 16 of the dividing surface 12 and emerge from the interferometer as ray 17. In this case one sees in the dividing surface 12 an interference band of infinite width. If the device of Fig. 7 is inclined by a small angle, then the dividing surface 12 does no longer include an angle of 90° with the surface 89 but a correspondingly altered angle. The rays 13′ and 13″ after reflexion at the surface 89 are deflected from their original direction in such a way that they no longer interfere with each other at point 16 but with neighbouring light rays, so that thereupon several interference bands are visible in the interferometer. The number of interference bands is a measure for the inclination of the device according to the figure. Since the ray 13′ passes twice through the dividing surface 12, the ray 13″ however suffers reflexions only, the emergent light is partially polarized. The plate 86 acting as an analyzer has the effect that light rays of equal direction of oscillation only come to interference, so that sharp interference bands are formed.

I claim:

An interferometer for determining the horizontal position of a body, comprising a first and a second prism connected with said body, each of said prisms having a first outer surface, said prisms being cemented together at their first outer surfaces, a semireflecting surface arranged between the two cemented prisms, each prism having a first and a second light transmitting surface and a totally reflecting outer surface, a third prism cemented on said two prisms to form a plane surface, a glass plate cemented upon said third prism and being fixedly connected to said body to form a chamber between said body and itself, an oil layer applied on said glass plate in said chamber, all the surfaces of the prisms and said oil layer being arranged so that a light beam entering the first light transmitting surface of said first prism impinges upon the semireflecting surface, and that one part of the light beam being reflected by this surface impinges upon the totally reflecting surface of said first prism and that the other part of the light beam passing through said semireflecting surface impinges upon the totally reflecting surface of said second prism, said totally reflecting surfaces of the prisms being arranged so that said one part of the light beam reflected by said totally reflecting surface of said first prism leaves said first prism through said second light transmitting surface and traverses said third prism and said glass plate to impinge upon said oil layer, said oil layer being arranged to reflect said one part of the light beam against said second prism to enter said second prism through said first light transmitting surface of said second prism and to impinge upon said totally reflecting surface of said second prism, said totally reflecting surface of said second prism being arranged to reflect said light beam to said semireflecting surface where said one part of the light beam is partially reflected to leave said second prism through said second light transmitting surface, and said totally reflecting surface of said second prism also being arranged so that the other part of the light beam having passed through the semireflecting surface is reflected to said oil layer through said first light transmitting surface of said second prism and through said third prism and said glass plate, said oil layer being arranged to reflect said other part of the light beam through said second light transmitting surface of the first prism to said totally reflecting surface of said first prism, said totally reflecting surface of said first prism reflecting said other part of the light beam to said semireflecting surface, one part of said other part of the light beam passing through said semireflecting surface and overlying with said one part of the light beam reflected by said semireflecting surface and leaving said second prism through said second light transmitting surface of said second prism.

(References on following page)

References Cited in the file of this patent

UNITED STATES PATENTS

| | | |
|---|---|---|
| 1,044,502 | Crehore et al. | Nov. 19, 1912 |
| 1,561,173 | Kosters | Nov. 10, 1925 |
| 2,629,283 | Zobel | Feb. 24, 1953 |
| 2,660,916 | Zobel | Dec. 1, 1953 |
| 2,701,961 | Svensson | Feb. 15, 1955 |
| 2,718,811 | Riepert et al. | Sept. 27, 1955 |
| 2,732,760 | Rantsch | Jan. 31, 1956 |

FOREIGN PATENTS

| | | |
|---|---|---|
| 595,211 | Germany | Apr. 12, 1934 |